Patented May 22, 1945

2,376,485

UNITED STATES PATENT OFFICE 2,376,485

GRANULAR BOUILLON

Siegwart Hermann and Marianne Hermann Hahn, New York, N. Y., and Herbert H. Dorer, New Brunswick, N. J., assignors to Verona Chemical Company, Newark, N. J., a corporation of New Jersey No Drawing. Application October 20, 1943, Serial No. 507,023

7 Claims. (Cl. 99—124)

This invention relates to a food product and particularly to a granulated bouillon and protein compound.

It is the object of the invention to provide a food product useful as a bouillon, as a vegetable fortification sauce base and as a product for use in the manufacture of synthetic meat products.

It is an object to provide such a product that is free of undesirable tastes and odors and one that possesses the desired characteristics of flavor and taste characteristic of meat products.

It is a further object to be able to secure a product, the bases of which is glue, but which is nevertheless free of undesirable tastes and odors.

The following description is devoted to both the method of preparation and the description of the composition and characteristics of the resulting product.

It will be understood that application Serial No. 507,024 of October 20, 1943, filed with this instant application is directed to covering the method of producing the product which is the subject of this application.

The problem which has been encountered in the past in an effort to make food products from glue has been that the resulting product has had an offensive odor and a medicinal taste that has been impossible to conceal no matter what added products have been placed in the combination.

It has been discovered that, as the result of the study of the hydrolysate of each of a variety of raw materials and a study of the neutralization curves of a gelatin hydrolysate and a gluten hydrolysate, that the hydrolysate from the glue showed a neutralization point of between 6 and 7 and at that point was found the optimal taste. When the glue product was dried at a lower pH than between 6 and 7, the material developed a bad taste. It was also discovered that on the neutralization curve of the gluten hydrolysate that the point when the gluten was free of excessive hydrochloric acid the pH had a value of approximately 4.5. It was also discovered that the best pH for other materials such as casein, soy beans and yeast seemed to be in the same neighborhood as the gluten material at 4.5. This led to the discovery that the glue hydrolysate as well as the other hydrolysates could not be mixed together in a solution and could not be dried together, but that at least the glue hydrolysate would have to be worked up separately and mixed together with other materials in the end in a dry state. When this was accomplished and the materials were made up according to that procedure there was no longer any disagreeable taste or odor which was characteristic of all of the materials and compounds that had been made heretofore in which the glue, glutens, soy beans, yeast, etc., had been mixed together and hydrolyzed together and then dried together which had made a product for most purposes which was not useable.

One of the fundamental features of this invention was to produce a product in which the glue hydrolysate had a pH of between 6 and 7 and the hydrolysate of the gluten, soy bean and yeast proteins had a pH value of 4.5 and upon the final dry mixing of the two hydrolysates it was found desirable that the product in its granulated form prepared as hereinafter described should have an approximate combined hydrolysate of 4.5. The resulting compound was a granulated bouillon of appetizing flavor and odor without any disagreeable taste or odor and without a medicinal flavor.

The following are typical examples of the method of preparing the product together with a description of the composition of the product and its characteristics.

Example I

Place 40 lbs. of glue that is free from arsenic and heavy metals into enough water and hydrochloric acid so that the 40 lbs. of glue are contained in 200 litres of double normal hydrochloric acid. The mixture is boiled until only a minimal amount of biuret reaction is obtained. Under no circumstances should the biuret be red or red violet in order to avoid a disagreeable or bitter taste. The hydrolyzed liquid is then filtered and neutralized partially with caustic soda, but not to the end point. The last neutralization is performed with sodium bicarbonate. The resulting product is dried.

Thereafter 30 lbs. of yeast are either hydrolyzed in the same way or with 1.5 lbs. of pepsin and 15 litres of double normal hydrochloric acid and 75 litres of water from 10 to 12 hours at 40° C. The neutralized extract is dried, ground and then mixed with the dried hydrolysate of the glue. An extract of 2 lbs. of dehydrated vegetables can be added for flavor. Thereafter the granulation of the powder is made with 3 lbs. of vegetable fat. From ¼ to ½ lb. of celery seeds can be mixed in if desired.

Example II 40 parts of light ground glue are added with stirring to 350 parts of water and 50 parts of double normal hydrochloric acid and one part of pepsin. The enzymatic digestion is continued until cloudy flakes are formed on the surface and the gluey consistency disappears completely so the liquid can be readily filtered. The filtrate is then neutralized as described above. The resulting product should be weakly alkaline to litmus.

Thereafter there is prepared a neutralizing extract from 30 parts of brewers yeast as described above to which has been added 30 parts of sodium chloride.

The two dried products are mixed together with chopped fresh vegetables with seasoning.

The powders are granulated together with 3 parts of vegetable fat.

*Example III*

In this example the glue was hydrolyzed as before. The casein and yeast are hydrolyzed by hydrochloric acid in an amount sufficient for hydrolyzing the casein, soy beans and yeast together. After this hydrolysis has been going on for 10 hours, the gluten and soy beans are added to this already partly hydrolyzed mixture and then the hydrolysis is continued for another 6 hours. The material is finally filtered, cooked with vegetables and dried. The two dried hydrolyzed products are then mechanically mixed with the necessary amount of fat. The foregoing procedure in this example was carried out in detail typically as follows:

(A) 400 grams of crude gelatin or glue are dissolved in 3900 ccs. of water at 60° C. To the solution are added 100 ccs. of concentrated hydrochloric acid (36%) and 10 grams of pepsin. The mixture is left standing for at least 36 hours at 40° C. It is then neutralized carefully with caustic soda to a pH of between 6 and 7. 2% of filter cel are added and the mixture is filtered. The filtrate should be clear. In it is dissolved 900 grams of sodium chloride, or ordinary table salt, and the material is dried either in vacuo or in a spray dryer. Both methods are perfectly satisfactory.

(B) 150 grams of casein and 400 grams of dry brewers yeast are thoroughly mixed with 1510 grams of concentrated hydrochloric acid and 1580 grams of water. The mixture is heated and kept at 90–95° C. for 10 hours with direct steam slightly superheated. This is done in an open vessel. Then 400 grams of wheat gluten and 150 grams of soy bean meal are added and mixed into the already partly hydrolyzed mixture. The whole is further kept at 90–95° C. for 6 to 8 hours. It is then neutralized with caustic soda carefully to obtain a pH of 4.5. 2% of filter cel are added and the whole is filtered. The filtrate is absolutely clear. The filter cake is washed with boiling hot water and the washings are added to the filtered solution. The remaining filter cake then is dried. We call it "Melanine" and we intend to try working this material up to an activated charcoal. To the filtrate are added the following materials:

| | Grams |
|---|---|
| Dehydrated vegetables (tomatoes, celery, parsnips, carrots, beans, turnips, etc.) | 20 |
| Sage leaves dehydrated | 0.5 |
| Dehydrated parsley | 0.5 |
| Dehydrated onion | 4 |
| Garlic | 5 |
| Paprica | 2 |

Then the mixture is cooked in a covered pot for ½ hour, then put through a strainer and the strained liquid is then dried in vacuo or in a spray dryer. The two dried powders A and B are put through a mixing mill with the addition of 2.5% of a vegetable fat and 5 grams of celery seeds.

In connection with the method of the preparation of the foregoing examples, it has been found that instead of boiling the liquid mixtures for some hours under reflux, it is possible to heat these mixtures to approximately 95° C. with direct steam in an open vessel. This gives a better result because it automatically removes the volatile fatty acids and the odors thereof associated therewith.

It also should be observed that the bytaste will come about from carrying the hydrolysis of the glue too far. This we avoid by careful control of the pH value at that point where the desirability of the taste is at its maximum.

Again it should be observed that one of the important factors in the invention is to produce a product which is free from disagreeable odors and tastes and this is accomplished by hydrolyzing and drying the glue alone and hydrolyzing and drying the gluten, soy bean and yeast alone and thereafter combining them in such a manner as to accomplish a pH of approximately 4.5. We find that as a result of this combination of the hydrolyzed glue of a pH of 6.5 and of the hydrolyzed gluten, soy beans and yeast of a pH of 4.5 that we secure a resulting pH that is approximately 4.5 which gives the optimal result in flavor and odor.

The product of a hydrolyzed glue of a pH of 6 to 7 and the fact that in that range there is the optimal in odor and taste characteristics is one of the discoveries constituting this invention.

It will be understood that the amounts of fats and salts can be varied according to the uses of the product.

Another feature of the invention is that it has been found that any of the commerical glues can be utilized without going to the expense of highly refined glues. A good grade of glue free from arsenic and heavy metals is satisfactory which places this product within a price range that makes it commercially practical.

It will be understood that we desire to comprehend within this invention such modifications as come within the scope of the claims and the invention.

Having thus fully described our invention what we claim as new and desire to secure by Letters Patent is:

1. A new article of manufacture for use as a bouillon having a pH value of approximately 4.5 when in an aqueous solution and comprising hydrolyzed glue having a pH value of from 6 to 7 and hydrolyzed proteins, said product having a pH value of 4.5.

2. A new product of manufacture for use as a food product comprising a hydrolysate of gelatin of a pH value of between 6 and 7 reduced to a dry powder and a hydrolysate of proteins of the class of soy beans yeast and gluten of a pH of approximately 4.5 mechanically combined and granulated with fats, the resulting product having a pH value of approximately 4.5, in aqueous solution.

3. A new product of manufacture for use as a food product comprising a hydrolysate of gelatin of a pH value of between 6 and 7 reduced to a dry powder and a hydrolysate of proteins of the class of soy beans, yeast and gluten of a pH of approximately 4.5 mechanically combined and granulated with fats, the resulting product having a pH value of approximately 4.5 and substantially free from volatile fatty acids, in aqueous solution.

4. As a new article of manufacture, a bouillon compound having a pH value of approximately 4.5 when in aqueous solution comprising a granular mixture of hydrolyzed glue having a pH value of from 6 to 7, hydrolyzed proteins from the group consisting of gluten, casein, soy beans, and yeast, and fat having a pH value of approximately 4.5.

5. As a new article of manufacture, a bouillon compound having a pH value of approximately 4.5 when in aqueous solution comprising a mixture of hydrolyzed glue having a pH value of from 6 to 7 and hydrolyzed proteins from the group consisting of gluten, casein, soy beans and yeast having a pH value of approximately 4.5.

6. As a new article of manufacture, a food product comprising a mixture of fat, a dry powdered hydrolysate of gelatin which has a pH of between 6 and 7 when in aqueous solution, and a dry powdered hydrolysate of proteins of the class of soy beans, casein, yeast and gluten having a pH of approximately 4.5 when in aqueous solution, said product having a pH value of approximately 4.5 when in aqueous solution.

7. As a new article of manufacture, a food product comprising a mixture of fat, a dry powdered hydrolysate of gelatin which has a pH of between 6 and 7 when in aqueous solution, and a dry powdered hydrolysate of proteins of the class of soy beans, casein, yeast and gluten having a pH of approximately 4.5 when in aqueous solution, said product having a pH value of approximately 4.5 when in aqueous solution and being substantially free from volatile fatty acids.

SIEGWART HERMANN.
MARIANNE HERMANN HAHN.
HERBERT H. DORER.